US008220483B2

(12) United States Patent
Gellweiler

(10) Patent No.: US 8,220,483 B2
(45) Date of Patent: Jul. 17, 2012

(54) NON-RETURN VALVE

(75) Inventor: Thomas Gellweiler, Osterholz-Scharmbeck (DE)

(73) Assignee: Ritag Ritterhuder Armaturen GmbH & Co. Armaturenwerk KG, Osterholz-Scharmbeck (DE)

(*) Notice: Subject to any disclaimer, the term of this patent is extended or adjusted under 35 U.S.C. 154(b) by 1001 days.

(21) Appl. No.: 12/096,677

(22) PCT Filed: Dec. 5, 2006

(86) PCT No.: PCT/EP2006/011663
§ 371 (c)(1),
(2), (4) Date: Jun. 9, 2008

(87) PCT Pub. No.: WO2007/065630
PCT Pub. Date: Jun. 14, 2007

(65) Prior Publication Data
US 2009/0000676 A1    Jan. 1, 2009

(30) Foreign Application Priority Data
Dec. 9, 2005   (DE) .......................... 10 2005 059 318

(51) Int. Cl.
*F16K 15/06* (2006.01)
(52) U.S. Cl. .................... 137/543; 137/543.13
(58) Field of Classification Search .................. 137/540, 137/542, 543, 543.13, 543.21
See application file for complete search history.

(56) References Cited

U.S. PATENT DOCUMENTS

| 1,361,738 | A | * | 12/1920 | McVoy | 137/493.9 |
| 1,462,519 | A | * | 7/1923 | Rothe | 137/541 |
| 3,209,777 | A | * | 10/1965 | Salisbury | 137/315.33 |
| 3,552,410 | A | * | 1/1971 | Amtsberg | 137/56 |
| 3,937,249 | A | | 2/1976 | Suey | |
| 4,203,466 | A | | 5/1980 | Hager | |
| 4,368,756 | A | | 1/1983 | Carlson | |
| 2003/0213479 | A1 | | 11/2003 | Wade | |
| 2006/0137747 | A1 | * | 6/2006 | Duex | 137/512 |

FOREIGN PATENT DOCUMENTS

| DE | 87 03 945 U1 | 5/1987 |
| DE | 87 06 470 U1 | 9/1988 |
| DE | 10 2004 006632 A1 | 8/2005 |
| EP | 1 329 657 A2 | 7/2003 |
| GB | 2 117 091 A | 10/1983 |
| GB | 2 408 561 A | 6/2005 |

OTHER PUBLICATIONS

German International Search Report, Mar. 21, 2007.

* cited by examiner

*Primary Examiner* — Kevin Lee
*Assistant Examiner* — Macade Brown
(74) *Attorney, Agent, or Firm* — Laurence P. Colton; Smith Risley Tempel Santos LLC

(57) ABSTRACT

A device for shutting off the flow in pipelines, hoses or the like, in particular a non-return valve having a housing for installing in a pipeline or the like. The housing has a flow channel, of which the flowed-through cross section can be closed by a valve, the valve having a valve disc for closing the cross section and a valve stem for guiding the valve and the valve being mounted by means of the valve stem in a retaining plate, so as to be displaceable in the direction of flow.

18 Claims, 3 Drawing Sheets

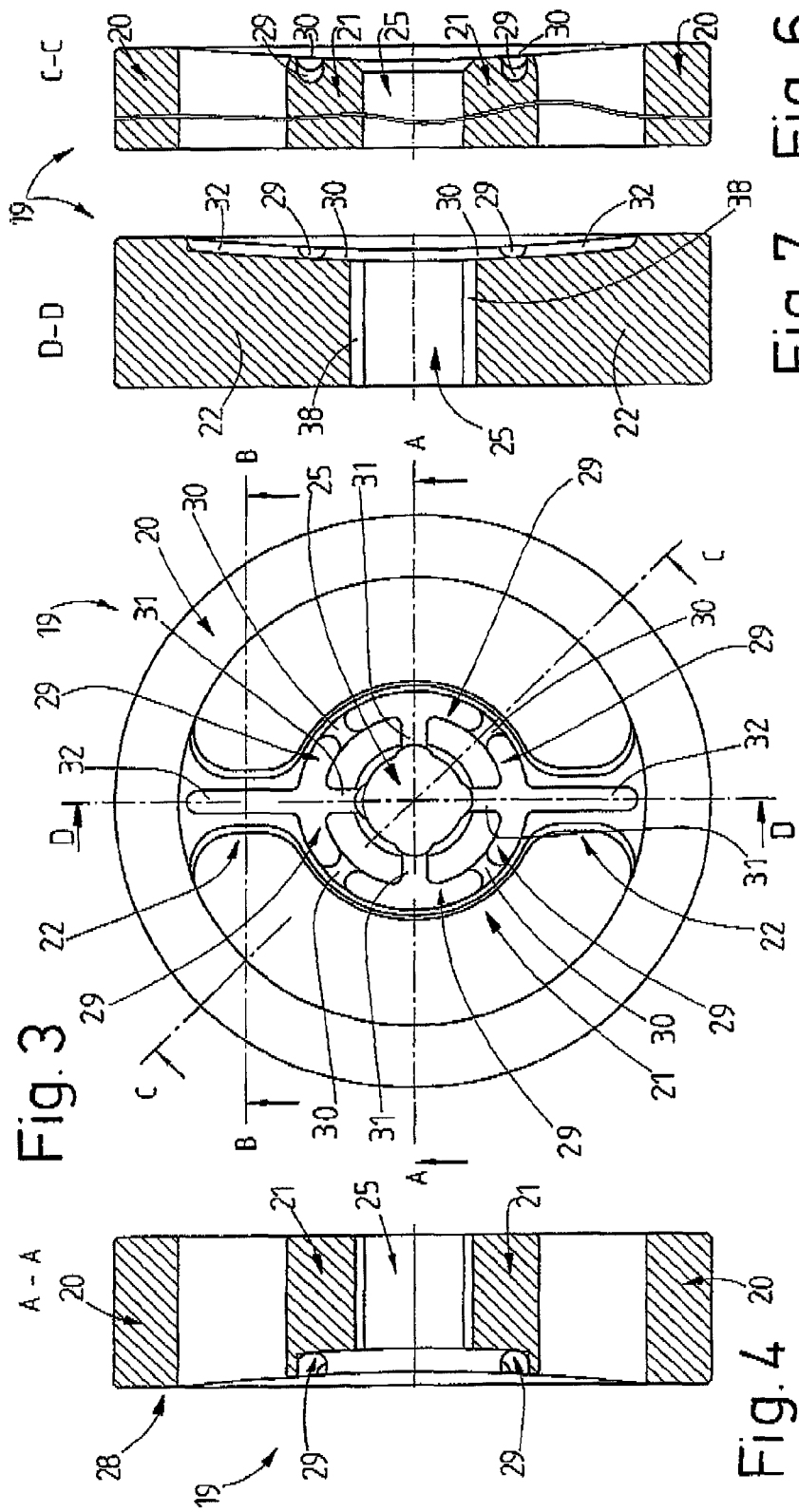

NON-RETURN VALVE

STATEMENT OF RELATED APPLICATIONS

This application is the U.S. National Phase Under Chapter II of the Patent Cooperation Treaty (PCT) of PCT International Application No. PCT/EP2006/011663 having an International Filing Date of 5 Dec. 2006, which claims priority on German Patent Application No. 10 2005 059 318.6 having a filing date of 9 Dec. 2005.

BACKGROUND

1. Technical Field

The invention relates to a device for shutting off the flow in pipelines, hoses or the like, in particular a non-return valve, comprising a housing for installing in a pipeline or the like, the housing having a flow channel, of which the flowed-through cross section can be closed by a valve, the valve having a valve disc for closing the cross section and a valve stem for guiding the valve and the valve being mounted by means of the valve stem in a retaining means, in particular a retaining plate, so as to be displaceable in the direction of flow.

2. Related Art

Devices or non-return valves of this type are known, for example, from DE patent application 10 2004 006 632 A1 in the name of the Applicant. This patent application is concerned with measures to prevent the formation of residues of a medium to be transported in the region of the valve. The background is the use of valves of this type in regions in which maximum possible cleanliness or cleanness is important, for example for use in the pharmaceutical and/or food industry.

SUMMARY

The object of the present invention is to develop the above-mentioned devices, in particular with regard to improved or alternative avoidance and/or removal of residues.

To achieve this object, one embodiment of the device according to the invention for shutting off the flow in pipelines, hoses or the like, in particular a non-return valve is characterized in that the retaining means and/or the valve has means for avoiding residues of a medium transported in the pipeline. It has surprisingly been found that residues are deposited even in these regions. Taking these regions into account to form valves on which few residues are deposited therefore helps to achieve the object.

In a preferred development of the invention, provision is made for the valve stem to be displaceably mounted in a preferably central bore in the retaining plate, at least one recess being formed on a front of the retaining plate that points counter to the direction of flow to prevent residues in such a way that the medium can be discharged via the recesses in the direction of the central bore. The medium may be both the actual medium to be transported in the pipeline and a flushing medium with which the valve is cleaned.

Another preferred development, which may also be embodied as an additional measure in conjunction with the foregoing development, provides for the front of the retaining plate that points counter to the direction of flow to be inclined obliquely to the direction of flow in such a way that the medium can be discharged in the direction of the central bore.

A third development of the invention, which may also be embodied as an additional measure in conjunction with one or both of the foregoing developments, provides for the valve stem to have, at least in a bearing region, at least one preferably spirally continuous recess in the direction of flow to avoid residues in the bore.

A fourth development of the invention, which may also be embodied as an additional measure in conjunction with one or more of the foregoing developments, provides for a substantially continuous recess, which is provided with mutually set-apart breaks as bearings for the retaining plate, to be formed in a bearing region of the valve spring on a back of the valve disc.

A fifth development of the invention, which may also be embodied as an additional measure in conjunction with one or more of the foregoing developments, provides for the bore for guiding the valve stem to have substantially a cross-sectional shape corresponding to the cross section of the valve stem, a plurality of protrusions, which run in the direction of flow of the medium to avoid residues in the bore, preferably being provided, in particular distributed over the circumference of the bore.

Each of the foregoing measures helps, per se and/or in combination with one or more of the other measures, to reduce the deposition of residues, namely in the region of the bore and at the bearing points of the valve spring. It has been found for the first time that the above-listed means for avoiding residues help at least to counteract depositions of the medium, because the critical regions are, for example, "flushed through" by means of purposefully arranged recesses.

In the first development, provision is preferably made for at least certain recesses to be inclined in the direction of the central bore. This helps to remove the medium as a result of the flow and/or gravity in the direction of the bore.

A preferred embodiment of the invention provides for the retaining plate to have an outer assembly region and an inner support region including the bore, the assembly region and the support region being joined together by webs and the recesses being formed in the region of the front of the webs and/or of the support region and leading into the region of the bore.

Arc of a circle-shaped recesses may be arranged in the front of the support region, adjacent recesses ending set apart from one another so as to create bearings for a valve spring. In this way, the valve spring rests not over the entire surface area but rather merely at certain points. The Applicant has found that residues also form in the regions of contact between the valve spring and the retaining plate, so the reduction of the contact regions or surfaces leads to an improvement.

Preferably, provision is made for recesses leading in the direction of the bore to be formed in the front of the webs. At least certain recesses in the support region should open into these recesses in the webs, to discharge the medium in the direction of the bore and to avoid the formation of residues.

A further preferred embodiment of the invention provides for the recesses to be formed as sunk and/or milled grooves.

Further details of the invention will emerge from the subclaims and the remainder of the description.

BRIEF DESCRIPTION OF THE DRAWING FIGURES

A preferred exemplary embodiment of the invention will be described hereinafter with reference to the drawings, in which:

FIG. 3 shows a front of a retaining plate of the valve according to FIG. 1;

FIG. 4 is a section through the retaining plate according to FIG. 3 taken along sectional line A-A;

FIG. 5 is a section through the retaining plate according to FIG. 3 taken along sectional line B-B;

FIG. 6 is a section through the retaining plate according to FIG. 3 taken along sectional line C-C;

FIG. 7 is a section through the retaining plate according to FIG. 3 taken along sectional line D-D;

DETAILED DESCRIPTION

Figure 1:
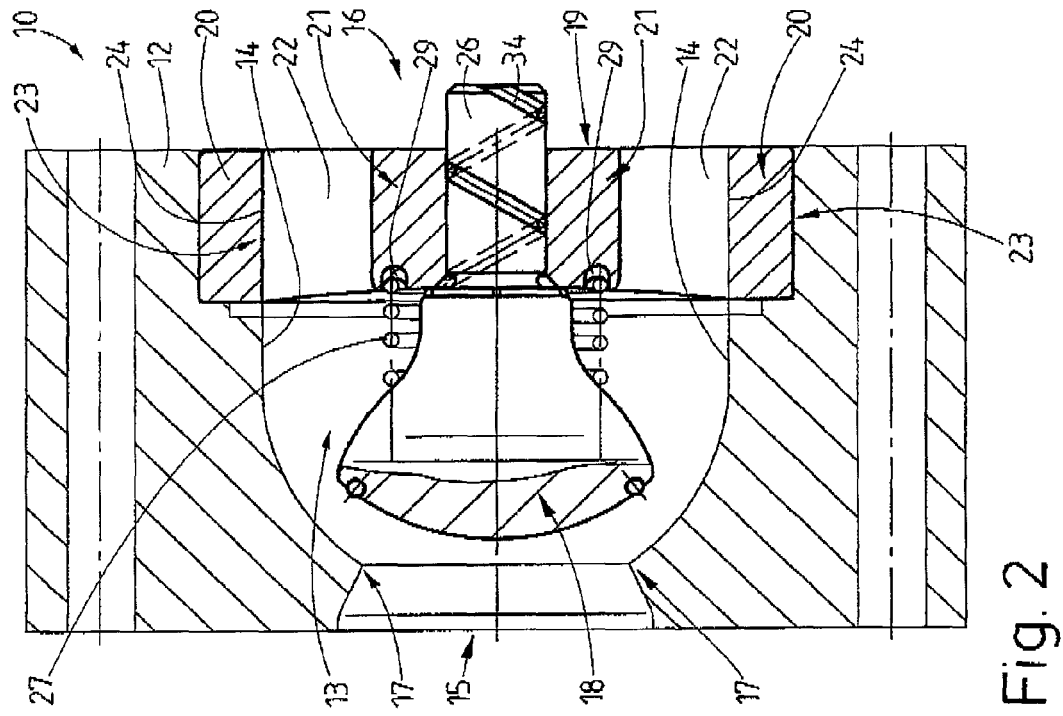
FIG. 1 is a vertical section through a non-return valve in the closed position.

The figures show a non-return valve 10. The non-return valve 10 can be installed in a pipeline (not shown). The non-return valve 10 can be arranged in a horizontally directed position as shown. Alternatively, an oblique or vertical orientation of the non-return valve 10 is also possible. The non-return valve 10 can be installed not only in pipelines but also in other media-conveying lines, for example hoses, channels or the like. The media to be transported may be both gaseous and liquid media.

The non-return valve 10 has a housing 12 which is substantially rotationally symmetrical in cross section and formed in which is a central flow channel 13 which is delimited by walls 14 of the housing 12. The flow channel 13 penetrates the housing 12 from an inlet opening 15 up to an outlet opening 16 which are each arranged on the edge. The inlet opening 15 and the outlet opening 16 are circular in cross section. The free cross section of the flow channel 13 varies over the flowed-through length of the housing 12, a valve seat 17, which can be closed in a sealing manner by a shut-off means, namely a valve disc 18, being formed in the region of a narrowing.

Starting from the valve seat 17, the cross section of the flow channel 13 widens respectively in the direction of the inlet opening 15 and the outlet opening 16. The course of the walls 14 of the flow channel 13 is in this case formed in such a way as to form no recesses in which the medium flowing through the pipeline can form residues in the event of shutting-off of the flow. This avoids such residues even when the non-return valve 10 is installed horizontally. It is ensured that preferably no depositions of the medium on the walls 14 can form in the event of sealing abutment of the valve disc 18 against the walls 14 of the flow channel 13. The above-mentioned recesses may be troughs, offsets or the like formed in the walls 14.

Further details of the geometry of the housing 12 may be inferred from DE patent application 10 2004 006 632.9 in the name of the Applicant, to which the invention refers for the sake of completeness of disclosure.

The valve disc 18 is mounted in a retaining means, namely a retaining plate 19, so as to be displaceable in the direction of flow. The retaining plate 19 is formed in cross section so as to correspond to the cross-sectional shape of the flow channel 13, i.e. it is circular. The retaining plate 19 consists of an outer assembly region 20 and an inner support region 21 which are joined together via webs 22. The outer assembly region 20 is annular in its formation and is preferably received completely in a recess 23 formed in the housing 12. The recess 23 corresponds substantially to the dimensions of the assembly region 20 and is formed all the way round the housing on the edge adjacent to the outlet opening 16. The dimensions of the recess 23 are such that the retaining plate 19 can be fastened to the housing 12 by a press fit or clearance fit. In addition, the recess 23 is formed in such a way that walls 24, which are directed toward the flow channel 13, of the assembly region 20 run substantially flush with adjacent walls 14 of the flow channel 13 or the pipelines.

The inner support region 21 serves to mount or guide the valve disc 18. Provided for this purpose in the support region 21 is a central bore 25 through which a corresponding valve stem 26, which is connected to the valve disc 18, extends. Furthermore, the support region 21 serves as a bearing for a spring means, namely a valve spring 27 which is prestressed counter to the direction of flow and moves and/or guides the valve disc 18 counter to the direction of flow for sealing abutment against the valve seat 17. The support region is formed so as to be approximately circular or annular in cross section and has a diameter which is slightly larger than the diameter of the spring means.

The webs 22 for connecting the support region 21 to the assembly region 20 are, in the exemplary embodiment shown, arranged so as to protrude radially and oppose one another on the support region 21. Two webs 22 are provided in the exemplary embodiment shown. Obviously, the number of webs 22 may also vary.

A special feature of the non-return valve 10 shown is that, in the region of the retaining means and the valve 11, consisting of the valve disc 18 and valve stem 26, measures are taken to prevent the formation and/or removal of residues of the medium transported in the pipeline. The individual measures will be described hereinafter:

A first measure is the formation of recesses 29 in a front 28 of the support region 21 of the retaining plate 19. In the context of this invention, the term "the front 28 of the support region 21 or of other members" refers in each case to the surface facing the inlet opening 15, i.e. to the side pointing counter to the direction of flow. In the present case, the recesses 29 are grooves which are embossed starting from the front 28 and have a substantially semicircular cross section. The recesses 29 can be embossed, sunk, milled or produced in a different manner. The cross-sectional shape may also vary.

The recesses 29 in the support region 21 extend annularly around the central bore 25. However, the recesses 29 are not arranged all the way round the bore 25; instead, many of them end set apart from one another, thus creating bearings 30 as support regions for the valve spring 27. The bearings 30 have comparatively small dimensions, so the area of contact between the valve spring 27 and support region 21 is as small as possible so as to minimize the accumulation of residues in this region.

Starting from the recesses 29, transversely directed recesses 31 lead into the bore 25. The transversely directed recesses 31 are oriented radially to the center of the bore 25. In extension of the transversely directed recess 31, further recesses 32 are provided in the front 28 of the webs 22. These further recesses also run radially to the center of the bore 25. The role of the recesses 29, 31, 32 is to discharge the medium flowing through the valve 10 in the direction of the bore 25 in order thus to counteract formation of residues in the region of the retaining plate 19. For this purpose, the recesses 29, 31, 32 are inclined in the direction of the central bore to divert the medium thereto.

As a further measure, provision is made for the entire front 28 of the retaining plate 19 to be inclined in the direction of the central bore 25 in order, in this way too, to ensure that the medium is discharged in the direction of the central bore 25 (FIG. 4).

As a special feature, provision is made for the valve stem 26 to be provided with a recess 34. The recess extends, starting from a back of the valve disc 18, up to a free end of the valve stem 26. The recess 34 should extend at least over the region with which the valve stem 26 is guided in the bore 25. It is therefore conceivable for only regions of the valve stem 26 to be provided over the length with the recess 34. The recess 34 itself is formed like the recesses described hereinbefore. However, it extends all the way round the circumference of the valve stem 26, namely in the manner of an outwardly continuous spiral. Other geometric shapes of the recess 34 are also conceivable.

Figure 2:
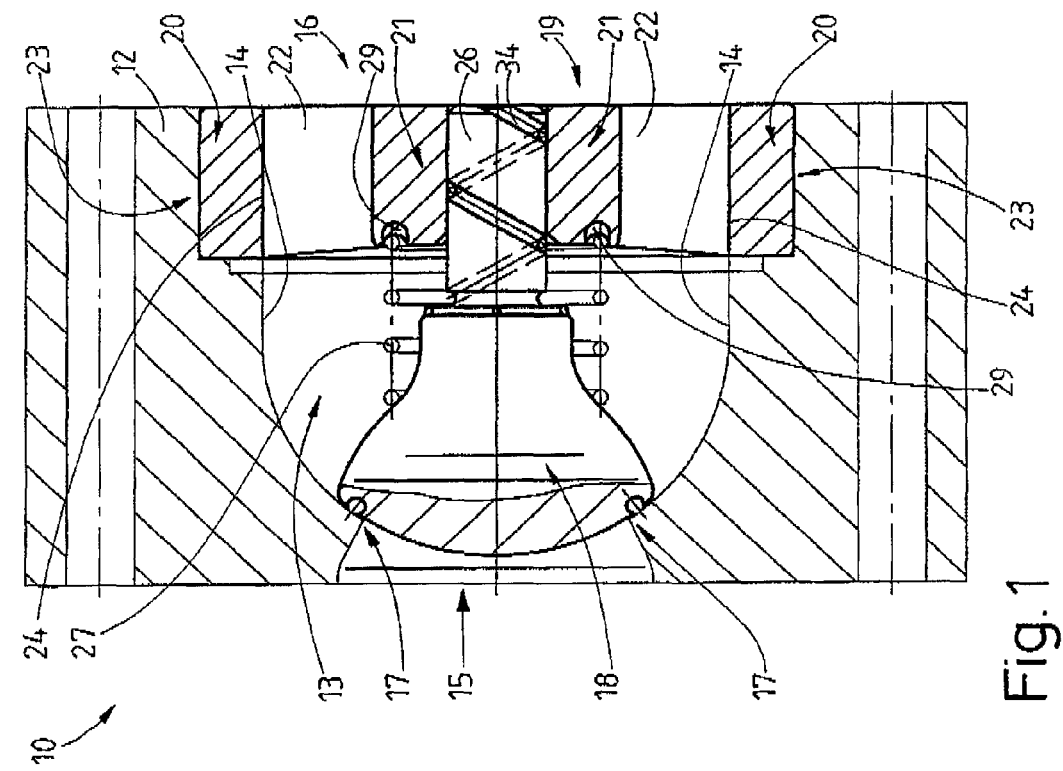
FIG. 2 is a similar view showing the non-return valve according to FIG. 1 in the opened position.
Figure 8:
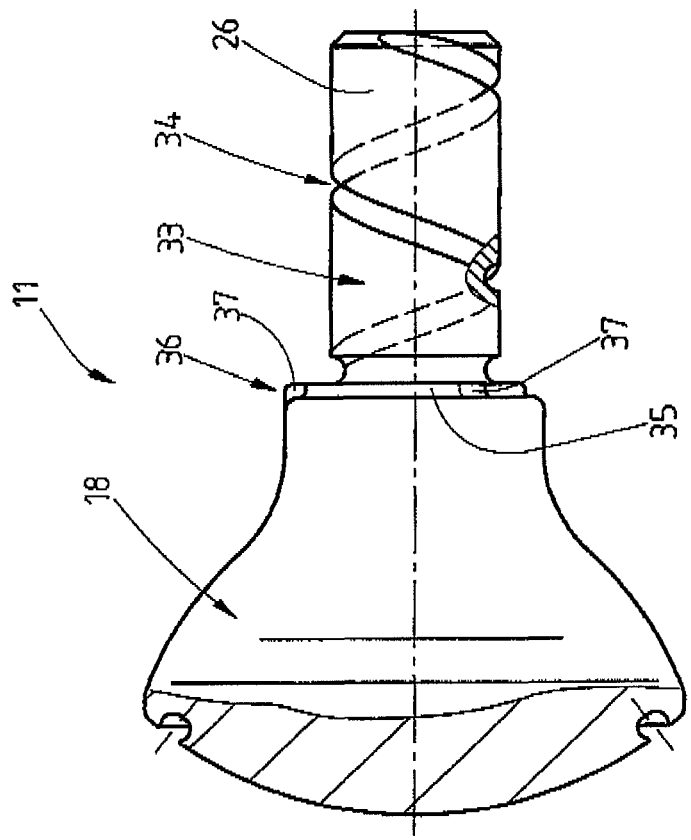
FIG. 8 is a schematic side view of a valve disc.
Figure 9:
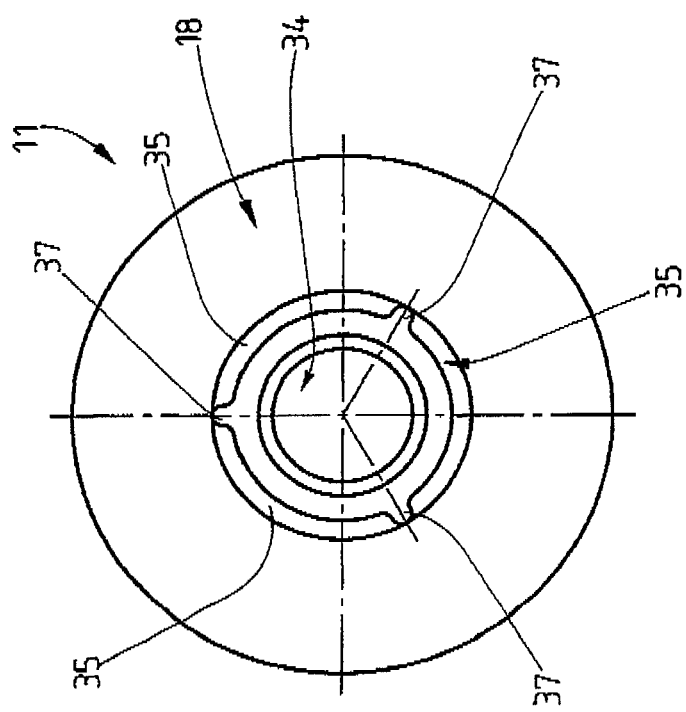
FIG. 9 is a plan view of the valve disc according to FIG. 8.

A further recess 35 is provided in the region of the back of the valve disc 18, namely in the region (bearing region) with which the valve disc 18 rests, in the opened position according to FIG. 2, on the support region 21 of the retaining plate 19. In this case too, the recess 35 is not formed all the way round the back of the valve disc 18; instead, bearings 37 are provided which break up the recess 35. In addition, the bearings 37 are arranged offset from the bearings 30 on the front 28 of the retaining plate 19.

A further special feature is the fact that the central bore 25 does not have precisely the same cross-sectional surface as the valve stem 26. There are provided protrusions 38 which protrude from the circular cross-sectional surface of the bore 25 and extend rectilinearly over the entire length of the bore 25. In addition, the transversely directed recesses 31 open into these protrusions 38. The protrusions 38 are therefore formed accordingly in the opening region of the recesses 31.

The above-described non-return valve 10 operates as follows: when the non-return valve 10 is closed (FIG. 1), the valve disc 18 rests in the region of the valve seat 17 and closes the inlet opening 15. When the valve is opened (FIG. 2), the medium to be transported in the pipeline is able to enter the housing 12 through the inlet opening 15 and flow through the flow channel 13. The medium flows in this case around the valve disc 18 and substantially through the free regions of the retaining plate 19 in the direction of the outlet opening 16. However, it has been found that a portion of the medium enters the region of the back of the valve disc 18 and the region of the central bore 25 in the support region 21 of the retaining plate 19. Starting from this finding, the recesses 34 on the valve stem 26 and the protrusions 38 in the bore 25 serve to facilitate the flow of the medium through the bore 25. The main purpose of the remaining recesses is to facilitate cleaning of the non-return valve 10. During cleaning, a cleaning medium flows through the pipeline, and thus the non-return valve 10, to remove residues of the previously transported medium. In this case, the non-return valve 10 is, as it were, "flushed through". In this process, the recesses 29, 31, 32 also have the task of guiding the medium in the direction of the bore 25. In addition, the small bearings 30, 37 for the valve spring 27 and the retaining plate 19 ensure that these members have a relatively small direct contact surface on the valve disc 18, so as few residues as possible accumulate in these regions.

LIST OF REFERENCE NUMERALS

10 Non-return valve
11 Valve
12 Housing
13 Flow channel
14 Wall
15 Inlet opening
16 Outlet opening
17 Valve seat
18 Valve disc
19 Retaining plate
20 Assembly region
21 Support region
22 Web
23 Recess
24 Wall
25 Bore
26 Valve stem
27 Valve spring
28 Front
29 Recess
30 Bearing
31 Recess
32 Recess
34 Recess
35 Recess
36 Region
37 Bearing
38 Protrusion

The invention claimed is:

1. A non-return valve device for shutting off a flow of a medium through a pipeline and hoses, comprising a housing for installing in the pipeline and a valve, wherein:
   the housing comprises a flow channel having a flowed-through cross section that can be closed by the valve;
   the valve comprises a valve disc for closing the cross section and a valve stem for guiding the valve, and the valve is mounted by means of the valve stem in a retaining plate, so as to be displaceable in a direction of the flow of the medium through the pipeline;
   the retaining plate and/or the valve comprises means for avoiding residues of the medium transported in the pipeline;
   a central bore in the retaining plate, the central bore having a circumference, the central bore comprising substantially a cross-sectional shape corresponding to the cross section of the valve stem, and the central bore comprising a plurality of protrusions extending from the circumference that run in the direction of the flow of the medium to avoid residues in the central bore, the plurality of protrusions being distributed over the circumference of the central bore;
   at least one recess on the front of the retaining plate; and
   the valve stem is displaceably mounted in the central bore, and the at least one recess on the front of the retaining plate points counter to the direction of the flow of the medium to prevent residues in such a way that the medium is discharged via the at least one recess on the front of the retaining plate towards the central bore.

2. The device as claimed in claim 1, wherein the front of the retaining plate that points counter to the direction of the flow of the medium is inclined obliquely to the direction of the flow of the medium in such a way that the medium is discharged towards the central bore.

3. The device as claimed in claim 2, wherein the valve stem comprises, at least in a bearing region, at least one spirally continuous recess in the direction of the flow of the medium to avoid residues in the central bore.

4. The device as claimed in claim 3, wherein the spirally continuous recess extends, starting from a back of the valve disc, continuously up to an end of the bearing region.

5. The device as claimed in claim 4, wherein the recesses are formed as sunk and/or milled grooves.

6. The device as claimed in claim 2, further comprising a region of transition from the front of the retaining plate to the central bore, the region of transition being inclined in the direction of the flow of the medium.

7. The device as claimed in claim 1, wherein the retaining plate further comprises a substantially continuous recess comprising mutually set-apart breaks as bearings for the retaining plate, the substantially continuous recess being formed in a bearing region of a valve spring on a back of the valve disc.

8. The device as claimed in claim 7, wherein at least certain of the at least one recess is inclined in the direction of the central bore.

9. The device as claimed in claim 7, wherein the bearings are distributed uniformly over a circumference of the substantially continuous recess.

10. The device as claimed in claim 7, wherein the bearing region is formed at a point of transition from a back of the valve disc to the valve stem.

11. The device as claimed in claim 1, wherein the retaining plate comprises an outer assembly region and an inner support region including the bore, the outer assembly region and the inner support region being joined together by webs and the at least one recess being formed in the webs and/or on the inner support region and leading towards the central bore.

12. The device as claimed in claim 11, wherein the at least one recess has an arc shape, and the at least one recess is arranged in the front of the inner support region, and wherein adjacent ones of the at least one recess are set apart from one another so as to create bearings for a valve spring.

13. The device as claimed in claim 11, wherein the at least one recess leading towards the central bore are formed in the front of the webs.

14. The device as claimed in claim 13, wherein at least certain of the at least one recess located in the inner support region open into the at least one recess in the webs.

15. The device as claimed in claim 13, wherein the at least one recess in the inner support region, which does not open into the at least one recess in the webs, opens into transversely directed recesses leading into the central bore.

16. A non-return valve device for shutting off a flow of a medium through a pipeline and hoses, comprising a housing for installing in the pipeline and a valve, wherein:
   the housing comprises a flow channel having a flowed-through cross section that can be closed by the valve;
   the valve comprises a valve disc for closing the cross section and a valve stem for guiding the valve, and the valve is mounted by means of the valve stem in a retaining plate, so as to be displaceable in a direction of the flow of the medium through the pipeline;
   the retaining plate and/or the valve comprises means for avoiding residues of the medium transported in the pipeline;
   the retaining plate further comprises a central bore and at least one recess on the front of the retaining plate, wherein the valve stem is displaceably mounted in the central bore in the retaining plate, and the at least one recess on the front of the retaining plate points counter to the direction of the flow of the medium to prevent residues in such a way that the medium is discharged via the at least one recess towards the central bore; and
   wherein the retaining plate further comprises an outer assembly region and an inner support region including the bore, the outer assembly region and the inner support region being joined together by webs and the at least one recess being formed in the webs and/or on the inner support region and leading towards the central bore, the inner support region being formed so as to be substantially annular around the central bore, the circular recesses being arranged radially in the support region and set apart from free lateral edges of the support region.

17. The device as claimed in claim 16, wherein the central bore comprises:
   a circumference;
   substantially a cross-sectional shape corresponding to the cross section of the valve stem; and
   a plurality of protrusions extending from the circumference that run in the direction of the flow of the medium to avoid residues in the central bore, the plurality of protrusions being distributed over the circumference of the central bore.

18. The device as claimed in claim 16, wherein the retaining plate further comprises a substantially continuous recess comprising mutually set-apart breaks as bearings for the retaining plate, the substantially continuous recess being formed in a bearing region of a valve spring on a back of the valve disc.

* * * * *